United States Patent Office 3,478,126
Patented Nov. 11, 1969

3,478,126
URETHANE MODIFIED EPOXY ESTER RESIN COMPOSITIONS AND PRODUCTS
Edward Thomas Turpin, Oakville, Ontario, Canada, assignor, by mesne assignments, to SCM Corporation, New York, N.Y., a corporation of New York
No Drawing. Filed May 26, 1967, Ser. No. 641,497
Int. Cl. C08g 39/10, 45/14
U.S. Cl. 260—835                                    9 Claims

ABSTRACT OF THE DISCLOSURE

Novel, urethane modified resin compositions comprising the reaction product of (1) a hydroxy diester of a linear diepoxide and an $\alpha,\beta$-ethylenically unsaturated monocarboxylic acid, and (2) an organic diisocyanate have been prepared and are described.

Compositions comprising the aforementioned reaction product and a copolymerizable monomer are also described. Cured films or castings obtained from the copolymerization of the urethane modified resin compositions and polymerizable monomer are further described.

Resin compositions comprising blends of the urethane modified epoxy resin compositions and conventional polyester resins and polymerizable monomers as well as the cured products of these compositions are shown.

---

The present invention relates to urethane modified epoxy ester resin compositions, to polymerizable solutions thereof and to mixtures of such compositions or solutions with conventional linear polyester resins.

The invention further relates to thermoset resin films and/or castings prepared from solutions of the urethane modified resin compositions or blends of such solutions with conventional linear polyester resins.

The invention is advantageous in that thermoset films or castings comprising the cured products of the resin compositions are significantly more resistant to the action of corrosive chemicals and solvents than are conventional thermoset polyester or epoxy resin films or castings.

One aspect of the invention provides a resin composition comprising the reaction product of (A) a hydroxy diester of a linear epoxy and an $\alpha,\beta$-ethylenically unsaturated monocarboxylic acid, and (B) from about 0.03 to about 0.75 mol of an organic diisocyanate per mole of said diester. The above reaction product is a urethane modified epoxy ester resin which provides cured films and castings which have improved corrosion resistance over conventional polyester and epoxide resins.

The urethane modified epoxy ester resin compositions can be dispersed in a variety of hereinafter defined polymerizable monomers to form polymerizable solutions or dispersions which, when cured, provide thermoset resins, coatings or castings having the advantages above referred to. The urethane modified epoxy ester resin compositions or solutions thereof with polymerizable monomers can be blended with conventional linear polyester resins which, when cured, provide films or castings which also have improved resistance to corrosive materials and solvents over conventional polyester or epoxy films or castings.

The hydroxy diester employed to form the urethane modified resin compositions is the reaction product of a known diepoxy ether or polyether and an ethylenically unsaturated carboxylic acid. Such esters are also known and are prepared by reacting 2 mols of ethylenically unsaturated carboxylic acid with one mol of a linear diepoxide in the presence of a catalyst.

Advantageous hydroxy diesters are formed from linear diepoxides of the formula $$\underset{O}{\overset{}{\triangle}}\text{CH}_2\text{CHCH}_2 {-}\!\!\left[\text{RCH}_2\text{CHCH}_2\!\!\underset{\text{OH}}{|}\right]_n\!\!{-}\text{RCH}_2\overset{O}{\overset{}{\triangle}}\text{CHCH}_2 \quad \text{(I)}$$

wherein $n$ is a number of from 0 to 20 and R is a divalent organic radical of the formula $$-\text{O}\!\!-\!\!\bigcirc\!\!-\!\!\text{O}-;\ \text{O}\!\!-\!\!\bigcirc\!\!\bigcirc\!\!-\!\!\text{O};\ \text{or}\ \text{O}\!\!-\!\!\bigcirc\!\!-\!\!\text{R}\!\!-\!\!\bigcirc\!\!-\!\!\text{O}-$$

where R is a carbon to carbon bond, a divalent and aliphatic chain or a divalent aryl radical. Another linear diepoxide which has been found to be advantageous in forming the hydroxy diesters employed in the urethane modified ester resin compositions is an epoxy ether or polyether of the formula $$\underset{O}{\overset{}{\triangle}}\text{CH}_2\text{CHCH}_2\text{O}\!\!-\!\!\left[\text{ROCH}_2\text{CHCH}_2\!\!\underset{\text{OH}}{|}\right]_n\!\!{-}\text{ROCH}_2\overset{O}{\overset{}{\triangle}}\text{CHCH}_2 \quad \text{(II)}$$

where R is a divalent organic radical and $n$ is a number of from 0 to 20. The divalent organic radical of the diepoxide falling within the scope of Formula II can be derived from a dihydric phenol such as resorcinol, catechol or phlorogucinol or from polynuclear or polycyclic dihydric phenols. Alternatively, the divalent organic radical may be divalent aliphatic radical derived from an alkane or a polyalkane diol.

By way of example, where the diepoxide is formed by the reaction of bisphenol-A and epichlorohydrin, the diepoxide will have the formula $$\overset{O}{\triangle}\text{CH}_2\!-\!\text{CH}\!-\!\text{CH}_2\!-\!\text{O}\!-\!\!\left[\bigcirc\!\!-\!\!\underset{(\text{CH}_3)_2}{\overset{|}{\text{C}}}\!\!-\!\!\bigcirc\!\!-\!\!\text{O}\!-\!\text{CH}_2\!-\right.$$

$$\left.\underset{\text{OH}}{\overset{|}{\text{CH}}}\!\!-\!\!\text{CH}_2\right]_n\!\!\text{O}\!-\!\!\bigcirc\!\!-\!\!\underset{(\text{CH}_3)_2}{\overset{|}{\text{C}}}\!\!-\!\!\bigcirc\!\!-\!\!\text{O}\!-\!\text{CH}_2\!-\!\text{CH}\!-\!\overset{O}{\triangle}\text{CH}_2$$

(III)

where $n$ is a number from 0 to 20 and depends upon the degree of polymerization.

By way of further example, where the diepoxide is the reaction product of 1,4-butanediol, the diepoxide will have the formula $$\overset{O}{\triangle}\text{CH}_2\!-\!\text{CH}\!-\!\text{CH}_2\!-\!\left[\text{O}\!-\!\text{CH}_2\!-\!\text{CH}_2\!-\!\text{CH}_2\!-\!\text{CH}_2\right]_n\!\!-\!\text{O}\!-\!\text{CH}_2\!-$$

$$\text{CH}_2\!-\!\text{CH}_2\!-\!\text{CH}_2\!-\!\text{O}\!-\!\text{CH}_2\!-\!\text{CH}\!-\!\overset{O}{\triangle}\text{CH}_2$$

(IV)

where $n$ is as above-described.

The aforedescribed compounds embrace conventional, commercially available linear diepoxides. When reacted with an ethylenically unsaturated monocarboxylic acid in stoichiometric molar proportions they form hydroxy diesters by virtue of the reactions of the acid with the epoxide groups.

By way of example, when a diepoxide compound is reacted with acrylic acid, the hydroxy diester will be of the formula

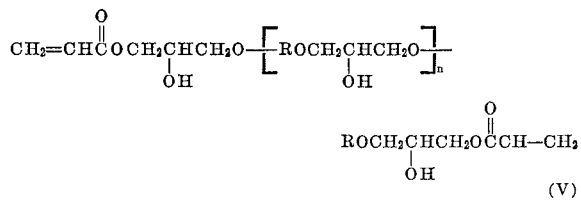

(V)

where $n$ has a significance described in the foregoing formulae.

In the foregoing Formula V, where the value of $n$ is zero, the reaction product will be a diester dihydroxy compound and where $n$ is zero, the diepoxide will have an epoxy equivalent of about 170. Advantageous diepoxides falling within the scope of the above formula will have an epoxy equivalent in the range of from about 170 to about 1700, since urethane modified diesters from these epoxy resin equivalents have been found to provide films or castings which are particularly resistant to the action of corrosive materials and solvents.

Although suitable diepoxy compounds employed to form the hydroxy diesters include conventional epoxy diethers or polyethers formed by the reaction of bisphenol-A and epichlorohydrin, other bisphenols may be employed as well as dihydric phenols and dihydric polycyclic and polynuclear compounds.

The epoxidized epichlorohydrin reaction product can be the reaction product of epichlorohydrin and, for example, 2,2'-bisphenol, 4,4'-bisphenol, 2,4'-bisphenol; halo-substituted bisphenols, such as tetrachloro- or tetrabromo-bisphenol-A or an alkylene-substituted bisphenol, such as methylene, ethylene, propylene or butylene bisphenols.

As will be hereinafter evident from the specific examples, the invention provides fire-resistant and/or fire-retardant, self-extinguishing thermosetting urethane modified epoxy ester resin compositions which are prepared by reacting epichlorohydrin with a tetra halo-substituted bisphenol, such halo-substituted diepoxides are then reacted with α,β-ethylenically unsaturated acids to form halo-substituted hydroxy diesters. When such halo-substituted diesters are thereafter reacted with an organic diisocyanate the resultant urethane modified halogen containing resins can be employed to form films and castings which are both fire-resistant and resistant to corrosive chemicals and solvents.

The term "ethylenically unsaturated monocarboxylic acid" as used herein is intended to mean and to refer to unsaturated monocarboxylic acids and to partial esters of polycarboxylic acids containing one unesterified carboxyl group. Examples of monocarboxylic acids include acrylic acid; butenic acids inluding crotonic, isocrotonic, vinyl acetic and methacrylic acid; pentenic acids, including tiglic, angelic and senecioic acids, hexenic teracrylic acid, hypogeic acid, oleic acid, elaidic acid, erucic acid, brassidic acid, behenic acid, and the like.

Examples of unsaturated monoarboxylic acids which consist of partial esters of unsaturated carboxylic acids and which contain one unesterified craboxyl group include fumaric, maleic, glutaconic, citraconic, itaconic, ethidene malonic, mesaconic, allylonic, propylidene, hydrobutaconic, pyrocinchonic, allylsuccinic, carbocaprolatonic and teraconic. Monocarboxylic acids which are partial esters of such polycarboxylic acids (and which contain one unesterified carboxyl group) by virtue of having been esterified with a monohydric or polyhydric alcohol have been found to form particularly useful hydroxy diesters when reacted with the aforementioned diepoxides.

Particularly desirable unsaturated monocarboxylic acids are acrylic and methacrylic acids and half esters of maleic and a mono- or polyhydric alcohol. Examples of such partial esters include the reaction products of one of the aforementioned polycarboxylic acids and a vicinal diol such as for example 1,2-propane diol, 1,2-butane diol, 1,2-pentane diol, 1,2-hexane diol, 1,2-heptane diol, etc. and/or lower alkylene oxides which are analogs of the above-mentioned vicinal diols. Specific examples of such monocarboxylic acids include the half ester of 1,2-propane diol and maleic acid, itaconic acid, citraconic acid and fumaric acid.

Preferred esters are those wherein the diepoxide compound is esterified with acrylic or methacrylic acids or the above-described half-esters of maleic and/or fumaric acids, since end products prepared from such diesters have particularly advantageous properties.

The hydroxy diesters are conventionally prepared by heating and mixing one of the aforedescribed ethylenically unsaturated monocarboxylic acids and a linear diepoxide in a ratio of 2 mols of acid per mol of diepoxide in the presence of a conventional inhibitor and catalyst. If desired, the reaction can be carried out in an inert liquid, usually a solvent. In such a conventional reaction the acid-diepoxide mixture is heated at a temperature between about 125 to about 200° C. over a period of from about 0.5 to about 5 hours, in the presence of a conventional amino catalyst and quinone inhibitor. Preferably the reaction mixture is maintained at a temperature within the range of from about 125° to about 135° C. until a substantial decrease in the acid number of the reaction mixture occurs, that is, until substantial quantities of the carboxylic acid groups have been esterified with the diepoxide to produce a hydroxy diester having an acid number below about 7. The hydroxy diester can be alternatively prepared by heating the acid with the inhibitor to a temperature within the afore-defined range and the diepoxide can be slowly added with agitation to the heated acid. Inert solvents are sometimes employed in reaction mixtures which tend to become undesirably viscous. Examples of such inert solvents are xylene or toluene.

Conventional inhibitors are employed in the foregoing esterification because of the presence of reactive vinyl groups in the reaction mixture and in the hydroxy diester formed. If an inhibitor is not used partial polymerization, due to the polymerization or vinyl groups can sometimes occur resulting in gelation of the reaction mixture. The inhibitors employed are conventional quinones or hydroquinones, with quinones being preferred because of the tendency of hydroquinones to inhibit final cure in the presence of air. Advantageous inhibitors include paraquinone, 2,5-dimethyl parabenzoquinone, 1,4-naphthaquinone, and anthraquinone, toluquinone, and the like.

The catalyst employed in this esterification is a conventional one, preferably a tertiary amine such as benzyl dimethylamine, propylamine, or triethylamine. The amount of catalyst employed is usually about one percent by weight based on the weight of the hydroxy diester.

As previously noted, compositions of this invention are the reaction products of the hydroxy diesters and an organic diisocyanate. The diisocyanates are organic compounds containing two N=C=O radicals and are sometimes called dicarbimides. Advantageous diisocyanates include toluene diisocyanate, hexamethylene diisocyanate, 4,4'-diphenyl methane diisocyanate; meta-xylene diisocyanate, and dianisidine diisocyanate. Of these, toluene diisocyanate and hexamethylene diisocyanate are preferred for economic reasons.

The urethane modified epoxide can be advantageously prepared by reacting the hydroxy diester and the dissocyanate in an organic liquid in order that solidification of the reaction mixture does not occur during the reaction. Any of a wide variety of an organic liquid may be employed as long as they are substantially inert with respect to diester and the diisocyanate. Examples of such organic liquids include naphtha, toluene, styrene, vinyl toluene, etc. After the reaction takes place the product is a solution comprising the urethane modified epoxy resin dissolved in the organic liquid which may be conventionally recovered by removing the solvent from the resin, usually by evaporation at low temperatures and pressures. Where the inert liquid is a polymerizable monomer such as styrene, it is not necessary to remove it from the urethane modified epoxy ester resin and the resultant product can be used directly to form cured films or cured castings by the addition thereof of conventional promoter/catalyst systems.

The amount of diisocyanate employed can vary between about 0.03 and about 0.75 mol per mol of hydroxy diester and will depend upon the molecular weight of the diester employed and the final molecular weight of urethane desired. If less than about 0.03 mol of organic diisocyanate per mol of diester is employed, the cured end products will often not have the desired resistance to corrosive materials and solvents. If more than about 0.75 mol of organic diisocyanate per mole of hydroxy diester is employed, the resultant produtcs will tend to gel or become solid even when dispersed in a copolymerizable monomer or solvent. Preferred ratios of organic diisocyanate are in the range from about 0.1 to about 0.75 mol per mol of diester because the end products obtained have been found to have optimum performance properties.

The mol ratio of diisocyanate to diester employed is dependent to some extent upon the molecular weight of the diester. Where the hydroxy diester has a molecular weight below about 850 it has been found advantageous to employ from about 0.30 to about 0.75 mol of organic diisocyanate per mol of hydroxy diester. Where the molecular weight of the diester is between about 850 to about 1500, from about 0.15 to about 0.30 mol of organic diisocyanate per mol of diester has been found to be advantageous. Where the molecular weight of the hydroxy diester is between about 1500 and 2500, from about 0.05 to about 0.15 mol of organic diisocyanate per mole of diester has been found to be preferable. Where the molecular weight of the hydroxy diester is between 2500 to about 4100, from about 0.03 to about 0.05 mol of organic diisocyanate per mol of hydroxy diester is preferred.

From the foregoing it is generally evident that in preferred compositions, the higher the molecular weight of the hydroxy diester, the smaller will be the amount of organic diisocyanate which is advantageously employed. If larger amounts of organic diisocyanates in those amounts described above are employed with hydroxy diesters having the molecular weights abovedescribed, the resultant reaction products will sometimes tend to gel and also will often tend to become difficultly soluble in the polymerizable monomer.

The above products are urethane modified resins which have functionality by virtue of the unsaturated ester groups on the termini of the hydroxy diester chain. When the urethane modified esters are dissolved in a polymerizable monomer containing vinyl unsaturation and the resultant solutions are cured using conventional promoter/catalyst systems, an article comprising a thermoset film or casting having the advantageous properties hereinbefore referred to, is obtained.

The urethane modified diesters can be suitably prepared by reacting the organic diisocyanate with the hydroxy diester in the presence of any of the conventional inhibitors and catalysts hereinbefore described at elevated temperatures, usually in the range of between 30° and about 200° F. preferably in intimate contact with an atmosphere of air. The reaction can be accomplished by mixing the hydroxy diester with the organic diisocyanate and the catalyst and inhibitor until the free isocyanate groups have disappeared from the reaction mixture after their reaction with the hydroxyl groups of the diester.

Alternatively the urethane modified diesters may be prepared by forming the hydroxy diester in situ immediately prior to the reaction with the organic diisocyanate. Thus, for example, the diepoxide is reacted with an ethylenically unsaturated carboxylic acid or a half-ester of an ethylenically unsaturated dicarboxylic acid in the presence of a conventional catalyst and inhibitor while in intimate contact with air until the acid number is reduced to below about 10 and the reaction mixture comprising the hydroxy diester is cooled and the organic diisocyanate is added thereto over a period of several hours or until the free isocyanate groups have been substantially reacted with the hydroxyl groups of the diester. In each instance the completeness of the reaction can be readily determined by viscosimetric measurement or by withdrawing small aliquot portions of the reaction mixture and determining the free isocyanate content thereof.

By so proceeding the urethane modified diester is formed. If desirable, the diester can be dissolved in any of the hereinafter defined polymerizable liquid monomers in an amount such as to provide between about 30 to about 60 weight percent of the urethane modified diester, the balance of the composition consisting essentially of the monomer. Although less than 30 percent of the urethane modified diester can be employed in such solutions, there is usually no advantage and cured films or castings formed from the solution will sometimes not have the desired resistance to corrosive materials. Although more than about 60 percent of the urethane modified diester can sometimes be incorporated in the liquid monomer, the incorporation of such excess is usually economically disadvantageous and there is some danger that the solution will become undesirably viscous.

The copolymerizable monomers which can be employed to form a solution are usually liquid hydrocarbons or substituted liquid hydrocarbons having olefinic unsaturation. Such hydrocarbons include, for example, viny aromatic hydrocarbons and their substituted counterparts wherein one or more of the hydrogen atoms are replaced by halogen atoms or amine, amide, imide, etc. groups. Such liquid hydrocarbons also include aliphatic hydrocarbons having one or a plurality of ethylenic double bonds and esters of unsaturated carboxylic acids, including esters of unsaturated monocarboxylic acids, dicarboxylic acids and tricarboxylic acids having ethylenic unsaturation. Examples of specific vinyl hydrocarbons or aromatic hydrocarbons include styrene, α-methyl styrene, p-methyl styrene, meta-ethyl styrene, paraisopropyl styrene, t-butyl styrene, vinyl naphthalene, vinyl toluene, divinyl benzene, including corresponding hydrocarbons wherein one or more hydrogen atoms are replaced by halogen atoms or groups such as amine, amide, imide, etc. radicals. Examples of liquid aliphatic hydrocarbons having a plurality of conjugated ethylenic double bonds include conjugated polyolefins such as 1,3-butadiene, methyl-2-butadiene, 1,3-piperylene, 2,3-dimethyl butadiene, cyclopentadiene, etc.

The above-described urethane modified diester resins or solutions thereof can be blended with conventional linear polyester resins or solutions of such resins in one of the aforedescribed monomers and the resultant compositions can be conventionally cured to form articles such as films or castings which have significantly greater resistance to the action of corrosive materials such as acids, alkalis, solvents, than the resistance of conventional polyester or epoxide resins to such corrosive materials.

Conventional polyester resins in which the urethane modified diesters may be blended or incorporated are conventional polyesters which are the condensation reaction products of one or more unsaturated organic acids with one or more polyhydric alcohols. Such polyesters are usually dissolved in a polymerizable monomer of the kind hereinbefore described. Such polyester solutions are substantially 100 percent polymerizable and form thermoset resins when polymerized. They are conventionally stabilized with phenolic inhibitors which permit storage for extended periods of time without extensive polymerization taking place. Suitable conventional polyester resin compositions are described in U.S. Patents 3,077,424, 2,852,487, 3,194,679, and 3,210,441, all of which are assigned to the assignee of the present application.

The amount of urethane modified resin of this invention which can be blended with a conventional polyester or epoxide resin composition may vary considerably within a range of between about 25 to about 75 percent of urethane modified resins based on the total linear resin content. Such resin blends are usually dispersed in one of the hereinbefore defined polymerizable monomers to control viscosity. The blends also contain a conventional inhibitor to prevent polymerization during storage. The amount of urethane modified diester employed in a given blend will depend upon a number of factors including a molecular weight of the urethane modified diester, the molecular weight of the conventional linear polyester, the amount of the polymerizable monomer employed, and the desired viscosity of the resultant blended resin composition.

For example when a higher molecular weight urethane modified diester is employed the composition will contain from about 25 to 50 percent of urethane modified diester and from about 75 to about 50 percent of conventional linear polyester resin solutions. Where the urethane modified resin has a lower molecular weight, from about 50 to about 75 percent of such resin can usually be blended advantageously with from about 50 to about 25 percent with conventional linear polyester resin. If amounts outside the above-defined ranges are employed, cured films or castings made from such compositions will either tend to be uneconomical or will not have the desired resistance to corrosive materials and solvents.

The blended compositions are dissolved in a hereinbefore defined polymerizable monomer to provide thermosetting resin compositions which can be conventionally curved to provide the films or castings of this invention. The amount of blend employed in the compositions will usually be in the range of from about 25 to about 60 percent of linear material, e.g., urethane modified diester—conventional resin and from about 75 to about 40 percent polymerizable monomer. If less than about 25 percent of the blended material is employed, films or castings made therefor will sometimes not have the desired resistance to corrosive materials and solvents. Although more than about 60 percent of such blend can sometimes be employed, there is usually no advantage and in some instances the product is uneconomical and may also be sometimes undesirably viscous.

As will be evident hereinafter from these specific examples, the above-described resin compositions can be cured in the form of a film or a casing in conventional promoter/catalyst systems, such as cobalt naphthenate and an organic peroxide. The resin composition can also contain conventional pigments, fillers, and thixotropic agents will known to those skilled in the coating composition and resin art.

In one emmbodiment of this invention, the resin compositions can comprise a polymerizable monomeric solution containing (on a solids basis) a blend of 50 to 95 percent of any of urethane modified epoxy diesters hereinbefore described and from about 50 to 5 weight percent of a conventional linear polyester. Such solid blends can constitute from about 10 to about 60 weight percent of the total solution. Solids content of such blended resins are usually liquid and do not gel on standing unless promoters and catalysts are added.

An example of one advantageous embodiment of this invention is a composition comprising:

(A) from about 30 to about 60 weight percent of the reaction product of (1) a hydroxy diester of a linear diepoxide and an ethylenically unsaturated monocarboxylic acid,
(2) from about .03 to about 0.75 mol per mol of said diester of an organic diisocyanate, and (B) from about 70 to about 40 weight percent of a polymerizable monomer.

Another advantageous embodiment of this invention is a composition comprising:

(A) from about 10 to about 30 weight percent of the reaction product of
(1) a hydroxy diester of a linear diepoxide and an ethylenically unsaturated monocarboxylic acid,
(2) from about .03 to about 0.75 mol of an organic diisocyanate per mol of said ester, and (B) from about 30 to about 10 weight percent of a linear resinous polymer selected from a group consisting of linear polyester and (C) from about 40 to about 60 weight percent of a polymerizable monomer.

The following specific examples are intended to illustrate the invention but not to limit the scope thereof, parts and percentages being by weight unless otherwise specified.

EXAMPLE 1

To a reaction vessel equipped with a mechanical stirrer and a thermostatically controlled electric heater there was charged one mol (346 grams) DER332 (a commercial epoxy resin produced by the Dow Chemical Company and being the reaction product of bisphenol-A and epichlorohydrin). DER332 has an epoxide equivalent of 173 and an average molecular weight of 347, a viscosity of 3600 cps. at 25° C. and is represented by Formula III about wherein the value of $n$ is 0.

Thereafter, there was charged 2 mols (144 grams) acrylic acid, 4.9 grams triethylamine and 2.5 millimols (0.310 gram) toluhydroquinone to the reactor. The resultant mixture was agitated and heated at 90° C. for 2 hours and then at 100° C. for 4 hours until the acid number had dropped to 3.7 indicating about a 98 percent conversion of the reactants to di-(3-acryloxy-2-hydroxy propyl) ether of bisphenol-A.

The resultant product was diluted with toluene to form a solution containing 30 parts by weight of toluene. To this solution while still in the reactor and while agitation was continued there was added 0.5 mol (87 grams) of toluene diisocyanate over a 30-minute period during which time the temperature was maintained at between 140° F. and 150° F. Heating was continued for an additional 15 minutes until an analysis of an aliquot portion of the reaction mixture indicated that no free isocyanate radicals were present therein. The resultant product was a light transparent amber colored material. The toluene was removed by distillation to a temperature of 100° C. and at a pressure of 10 millimeters of mercury. The resultant product was a light transparent amber colored urethane modified epoxy ester resin solid. Sixty (60) weight parts of this material were dissolved in 40 weight parts of styrene. To 100 grams of this solution there was added 0.2 gram diethylaniline and 1.0 gram of benzoyl peroxide, and 0.05 gram paraffin wax (M.P. 135° F.). Upon applying this material to a metal workpiece a film formed which was resistant to acids, alkalis and solvents.

EXAMPLE 2

To the reactor of Example 1 there was added 2 mols (172 grams) of methacrylic acid, 1.7 grams of triethyl amine and 60 milligrams of paraquinone. These materials were agitated and heated to 125° C. Thereafter one mol (346 grams) of DER332 were added to the heated mixture drop-wise over a period of one hour while the temperature was maintained between 125–130° C. At the end of this period the reaction product had an acid number of below one indicating virtual complete reaction. The product was di-(3-methacryloxy-2-hydroxy propyl) ether of bisphenol-A and was a brown syrupy liquid. This material was dissolved in toluene and reacted with toluene diisocyanate using the procedure of Example 1. Thereafter the toluene was removed to form a brown resinous solid which was later dissolved in an equal weight of styrene. A portion of this solution was cast into a rod and cured using diethylaniline and benzoyl peroxide in the amounts employed in Example 1. The cured product showed substantially no loss of weight after immersion in acetone for 14 days indicating its resistance to solvent.

EXAMPLE 3

A polymer composition consisting substantially of the reaction produce of a diepoxide, methacrylic acid and toluene diisocyanate was prepared using the ingredients in the amount listed in Table I below:

Table I

| | Pounds |
|---|---|
| Araldite 6004 [1] | 6186.6 |
| Methacrylic acid [2] | 3052.8 |
| Benzyl dimethylamine | 14.6 |
| Hydroquinone | 4.1 |
| p-Benzoquinone | 3.6 |
| Toluene diisocyanate | 1546.2 |
| Styrene | 5400.0 |
| Diethylaniline | 18.0 |
| Cobalt Naphthenate [3] | 18.0 |

[1] A diepoxide resin sold commercially by the Ciba Company.
[2] Containing 250 p.p.m. of monomethyl hydroquinone.
[3] Containing 6 percent Co.

The diepoxide, acrylic acid, and benzyl dimethylamine were charged to a standard plant resin reactor and mixed thoroughly. Thereafter while mixing was continued the hydroquinone and p-benzoquinone were charged into the reactor and air was sparged into the reactor at the rate of 4 cubic feet per minute. The reactor was then closed while air sparging and mixing were continued and the contents were heated to 280° F. over a 30-minute period. Heating was continued and the acid value of the contents of the reactor were checked periodically until it had reached 4.5.

Thereafter the contents which consisted of a reaction mixture comprising the methacrylate diester of the diepoxide were transferred into a second reactor also equipped with air sparging means, an agitator and an electrically controlled thermostatic heater. Prior to the addition of the ester the styrene was added to the second reactor. The resin was dispersed in the styrene by mechanical mixing during which time air was sparged into the solution and the temperature of the contents (in the second reactor) was decreased by cooling to 150° F. Then, while maintaining the temperature of the contents at 150° F. four-fifths of the toluene diisocyanate was added slowly at a rate sufficient to maintain the temperature of the contents of the reactor at 145–150° C. Mixing and air sparging were continued after the addition of the toluene diisocyanate and the viscosity of the reactor contents was checked every 30 minutes until a viscosity of P (Gardner scale) was obtained when 90 grams of resin were blended with 10 grams of styrene, after which the remainder of the toluene diisocyanate was added and the viscosity of the contents was checked until a Gardner reading of X–Y was obtained. The resulting product consisted essentially of the reaction product of the epoxide, methacrylic acid and toluene diisocyanate dissolved in styrene. Thereafter 14.4 pounds of paraffin wax and 1800 pounds of a conventional thixotropic polyester resin solution (shown in Table II below) were added to the solution.

Table II

| | Pounds |
|---|---|
| Styrene | 1800 |
| Silica | 100 |
| Propylene glycol | 13.26 |
| Diethylene glycol | 17.85 |
| Maleic anhydride | 13.5 |
| Isophthalic acid | 29.75 |
| Styrene | 27.43 |
| Hydroquinone | 0.006 |
| p-Benzoquinone | 0.003 |

The foregoing polyester solution was blended with the urethane modified diepoxide ester solution for 15 minutes after which time 1800 pounds of a commercial resin solution, the reaction product of glycol-maleic anhydride, isophthalic acid, polyester resin solution having the formula shown in Table III was added and blended with the aforementioned blended mixture.

Table III

| | Pounds |
|---|---|
| Propylene glycol | 1364 |
| Diethylene glycol | 1773 |
| Maleic anhydride | 1341 |
| Isophthalic acid | 2776 |
| Styrene | 2745 |
| Hydroquinone | 0.55 |
| p-Benzoquinone | 0.44 |

Eighteen pounds of diethylaniline and 18 pounds of cobalt naphthenate containing 6 percent cobalt was then added to the resulting blend which was mixed in the reactor for 3 hours during which time air was continuously sparged into the blended product. During this period the temperature was maintained at about 100° F.

Portions of the final product, when conventionally cured with standard catalyst/promoter systems, produced films and castings which were resistant in hydrochloric acid and acetone solutions for periods of 3 weeks and longer.

EXAMPLE 4

The procedure of Example 3 was repeated except that 0.6 molecular proportion of hexamethylene diisocyanate was used in place of the 0.5 molecular proportion of toluene diisocyanate employed in that example. Cured films and castings obtained from the composition had substantially the same resistance to hydrochloric acid and acetone as the films and castings obtained from the compositions of Example 3.

EXAMPLE 5

The procedure of Example 3 was repeated except that .35 molecular proportion of meta-xylene diisocyanate was used in place of the 0.5 molecular proportion of toluene diisocyanate employed in that example. Cured films and castings prepared from this composition showed similar resistance to acetone and hydrochloric acid to the films and castings obtained from the products of Example 3.

EXAMPLE 6

The procedure of Example 1 was repeated except that 2 mols of the half ester of maleic anhydride and iso-octyl alcohol were employed in place of the acrylic acid employed in that example. The final product obtained was, upon reaction with the diepoxide, the di-mono-octyl maleate ester of the diepoxide. When this product was reacted with toluene diisocyanate using the procedure employed in the last paragraph of Example 1, a urethane modified epoxy ester resin solid was obtained which, when dissolved in styrene and cured with cobalt naphthenate and methyl ethyl ketone peroxide formed films and castings which resisted the action of acetone and hydrochloric acid for 2 weeks when immersed in these liquids.

EXAMPLE 7

The procedure of Example 3 was repeated except that the di-(mono-iso-octyl maleate) ester of Araldite epoxy resin was employed in place of the methacrylate ester of Araldite employed in that example. The solid castings obtained had comparable resistance to acetone and hydrochloric acid to those of films and castings prepared from the cured products of Example 3.

EXAMPLE 8

The procedure of Example 1 was repeated except that the euoxy ester employed was the di-(mono-iso-butyl fumarate) ester of the epoxide in place oif the acrylate epoxide ester employed in that example. When dissolved in styrene and cured, films and castings obtained from the resins were resistant to hydrochloric acid and to acetone for 15 days without alteration of their surface properties.

EXAMPLE 9

The procedure of Example 1 was repeated except that the epoxy ester employed was the di-(mono-hydroxy propyl maleate) ester of the epoxide in place of the acrylate epoxide ester employed in that example. When dissolved in styrene and cured, films and castings were resistant to hydrochloric acid and to acetone for more than 15 days without alteration of their surface properties.

EXAMPLE 10

The procedure of Example 3 was repeated except that di-(mono-iso-butyl fumarate) ester of the epoxide resin was employed in place of the methacrylate ester employed in that example. Cured products of the finished blends prepared and cured as described in Example 3 did not show swelling or solution in hydrochloric acid or acetone for 10 days when immersed in these materials.

EXAMPLE 11

The procedure of Example 3 was repeated except that the di-(mono-iso-octyl maleate) ester of the epoxy resin was employed in place of the methacrylate ester of the Araldite epoxy resin employed in that example. Solid castings of the blends of the final urethane modified polyester compositions had comparable resistance to acetone and hydrochloric acid as to those films and castings prepared from the cured products of Example 3.

EXAMPLE 12

One-half mol (450 grams) of Epi-Rez 5163 (the diglycidyl ether of tetrabromo bisphenol-A) and one mol (86 grams) methacrylic acid were mixed with 5 grams triethylamine and 1.25 millimols toluhydroquinone. The mixture was heated at 90° C. for 5.25 hours until the acid number had fallen to 3.4 indicating substantial completion of the esterification reaction. The product was an amber colored resin which was diluted with styrene to form a solution containing 30 percent by weight of styrene. Thereafter the solution was reacted with 0.25 mol of toluene diisocyanate to form a urethane modified product. When the composition was cured to form a casting and attempts were made to ignite the casting, no flame resulted indicating that the product was flame-resistant and fire-retardant and self-extinguishing.

What is claimed is:

1. A composition of matter comprising the reaction product of:
    (a) a hydroxy diester formed by the reaction of a linear diepoxide and an ethylenically unsaturated half ester of a dicarboxylic acid and 1,2-propane diol, and
    (b) from about 0.03 to about 0.75 mol of an organic diisocyanate per mol of said hydroxy diester.
2. The composition of claim 1 wherein said carboxylic acid is the half ester of maleic acid and 1,2-propane diol.
3. The composition of claim 1 wherein the carboxylic acid is the half ester of fumaric acid and 1,2-propane diol.
4. A composition comprising:
    (a) from about 95 to about 50 weight percent of the reaction product of:
        (1) a hydroxy diester of a linear diepoxide and an ethylenically unsaturated monocarboxylic acid, and
        (2) from about 0.03 to about 0.75 mol of an organic diisocyanate per mole of said hydroxy diester;
    (b) from about 5 to about 50 weight percent of a linear unsaturated polyester prepared from the reaction of at least one polyhydric alcohol with at least one unsaturated polycarboxylic acid.
5. The composition of claim 4 wherein the ethylenically unsaturated monocarboxylic acid is a partial ester of a polycarboxylic acid containing one unesterified carboxyl group.
6. The composition of claim 4 wherein the hydroxy diester is halogenated.
7. The composition of claim 4 wherein from about 10 to about 60 weight percent of said resin are dispersed in from about 90 to about 40 weight percent of a polymerizable monomer.
8. The composition of claim 4 wherein (A) is the reaction product of the di(3-methacryloxy-2-hydroxy propyl) ether of bisphenol-A and from about 0.27 to about 0.75 mol per mol of said diester of toluene diisocyanate and (B) is a linear polyester.
9. An article comprising the cured composition of claim 8.

References Cited
UNITED STATES PATENTS

| | | | |
|---|---|---|---|
| 3,301,743 | 1/1967 | Fekete | 260—836 |
| 3,317,465 | 5/1967 | Doyle | 260—836 |
| 3,373,075 | 5/1968 | Fekete | 260—837 |
| 3,373,221 | 3/1968 | May | 260—835 |
| 3,377,406 | 4/1968 | Newey | 260—836 |

MURRAY TILLMAN, Primary Examiner

PAUL LIEBERMAN, Assistant Examiner

U.S. Cl. X.R.

260—37, 41, 78.4, 78.5, 830, 836, 837